UNITED STATES PATENT OFFICE.

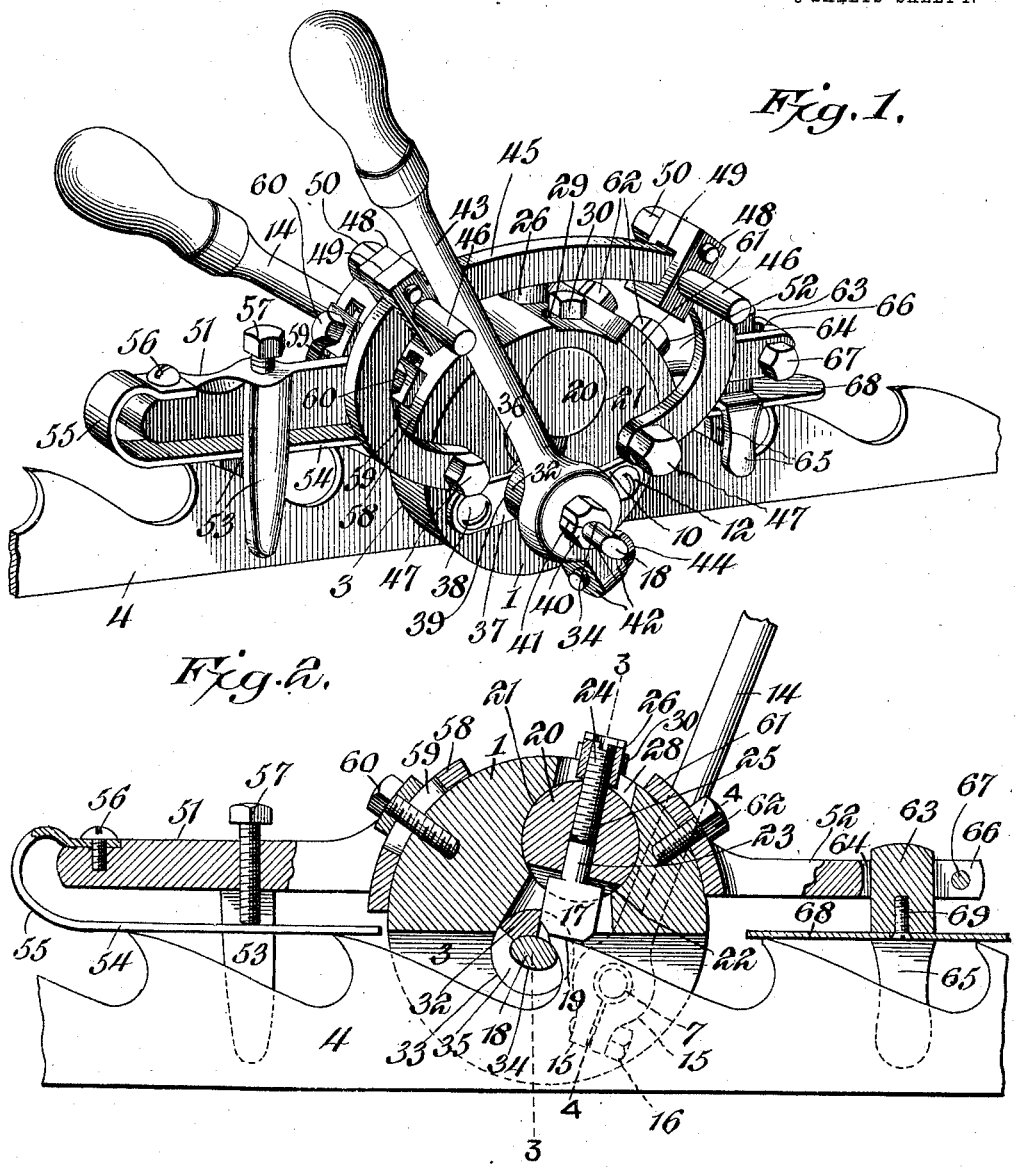

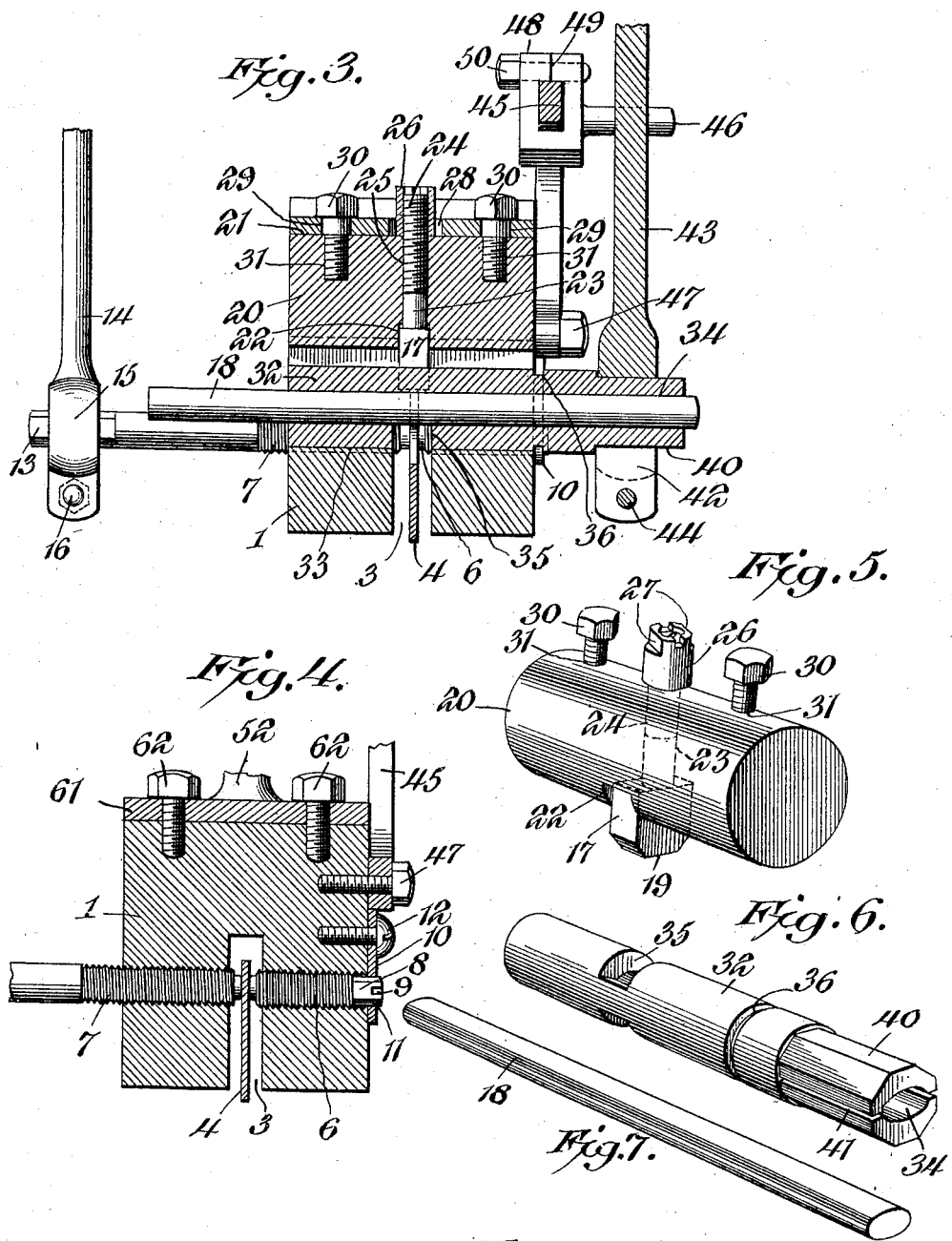

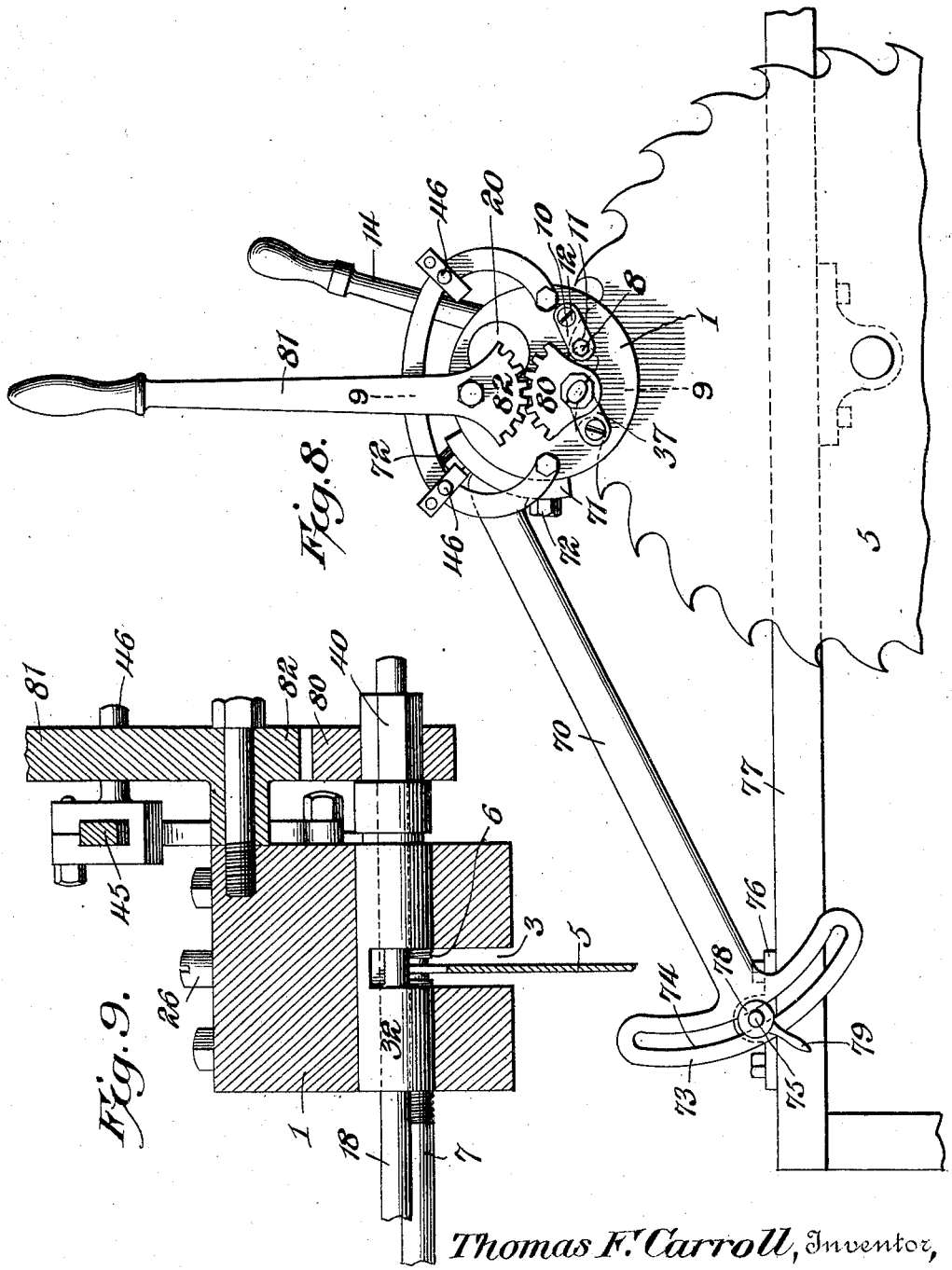

THOMAS F. CARROLL, OF EAU CLAIRE, WISCONSIN.

SAW-SWAGE.

983,427.  Specification of Letters Patent.  Patented Feb. 7, 1911.

Application filed June 22, 1909. Serial No. 503,703.

*To all whom it may concern:*

Be it known that I, THOMAS F. CARROLL, a citizen of the United States, residing at Eau Claire, in the county of Eau Claire and State of Wisconsin, have invented a new and useful Saw-Swage, of which the following is a specification.

The invention relates to improvements in saw swages.

The object of the present invention is to improve the construction of saw swages, and to provide a simple, inexpensive and efficient saw swage, designed for operating on both band and circular saws, and capable of affording fine, accurate adjustments, and of limiting the movement of the die bar or member to prevent the anvil from being subjected to excessive pressure and being injured by the same.

Another object of the invention is to provide a saw swage of this character, equipped with a die bar of simple construction, adapted to afford a relatively large amount of surface for engagement with saw teeth.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a saw swage, constructed in accordance with this invention and arranged for operating on band saws. Fig. 2 is a longitudinal sectional view of the same. Fig. 3 is a transverse sectional view on the line 3—3 of Fig. 2. Fig. 4 is a similar view, taken substantially on the line 4—4 of Fig. 2. Fig. 5 is a detail perspective view of the anvil and the anvil-supporting member. Fig. 6 is a detail perspective view of the die-carrying member. Fig. 7 is a similar view of the adjustable and reversible die bar. Fig. 8 is a side elevation of the saw swage, the same being equipped and arranged for operating on circular saws. Fig. 9 is a transverse sectional view, taken substantially on the line 9—9 of Fig. 8.

Like numerals of reference designate corresponding parts in all the figures of the drawings.

The saw swage comprises in its construction a substantially cylindrical block or head 1, provided in its lower half with a longitudinal slot 3 for the reception of a band saw 4, or a circular saw 5, as hereinafter explained. The saw swage, which is placed upon the saw 4, as illustrated in Fig. 2 of the drawings, is clamped in position by transversely disposed clamping screws 6 and 7, arranged horizontally and adapted to engage the saw 4 at the front and rear side faces thereof, as clearly illustrated in Fig. 4 of the drawings. The clamping screws are mounted in suitable threaded openings of the block or head 1, and the front clamping screw 6 is provided with a polygonal outer end 8, preferably of octagonal shape, but any other form of head may be employed. The outer or front end 8 of the clamping screw 6 is provided with a groove 9 for the reception of the blade of a screw driver, and it is secured in its adjustment by means of a locking plate 10, having an octagonal opening 11 conforming to the configuration of the polygonal outer end 8 of the screw 6 and accurately fitting the same. The locking plate 8 is detachably secured to the front face of the block or head 1 by a screw 12, or other suitable means, and it is adapted to be detached to permit the screw to be adjusted. The octagonal head permits an eighth of a revolution adjustment of the screw, and when the latter has been adjusted and the locking plate reapplied, the screw is positively held against rotary movement, so that there is no liability of its slipping after an adjustment. The rear clamping screw 7 has a polygonal outer or rear end 13, to which an upwardly extending arm or hand lever 14 is secured. The arm or lever 14, which has a suitable grip or handle at its upper end, is provided at its lower end with an enlargement or head, which is split to form two clamping sides 15. The sides are held in engagement with the polygonal end 13 of the clamping screw 7 by means of an adjusting screw 16. The arm or lever 14 is adapted to be oscillated to clamp and release the saw blade, and the front clamping screw is adapted to be adjusted with the rear screw to arrange the saw swage for saw blades of different thicknesses and to position the same centrally of the slot or passage 3.

The points of the teeth of the saw blade 4 are swaged and spread between an upper anvil 17 and a lower die bar 18. The anvil consists of a block or plate of substantially rectangular form, cut away at the lower corners and presenting a straight lower edge 19 to the saw teeth. The anvil, which is adapted to rest upon the back of the saw tooth, as clearly illustrated in Fig. 2 of the drawings, is carried by a round or cylindrical support 20, journaled in a circular bearing opening 21 of the block or head 1, and arranged transversely of the upper portion thereof, and capable of rotary movement to oscillate and thereby adjust the anvil, which depends from the bottom of the support or member 20. The anvil support or member 20 is provided at its bottom with a longitudinal groove 22, having straight parallel side walls and snugly receiving the anvil 19, which is held against lateral or rotary movements in the recess. The anvil is provided with an upwardly extending shank 23, preferably round, as shown, and engaged by a set screw 24, adapted to be adjusted to arrange the anvil properly with relation to the teeth of the saw. The anvil support 20 is provided with a diametrically arranged opening 25, extending upward from the groove 22 and receiving the shank 23 of the anvil and the screw 24, which is arranged in the upper portion of the opening 25. The opening 25 is threaded at the upper portion for the reception of the screw 24, and the lower portion, which receives the shank or stem 23 of the anvil is preferably smooth. The lower end of the screw 24 forms an adjustable abutment for the stem or shank of the anvil, and the screw is secured in its adjustment by a jam or lock nut 26, preferably of cylindrical form, and engaging the anvil support at the top thereof, as clearly illustrated in Figs. 2 and 5 of the drawings. The screw and the jam nut are provided with grooves for the reception of the blade of the screw driver, and the jam nut is also preferably recessed at opposite sides to provide wrench-receiving faces 27, but any suitable means could be employed for adjusting the nut and the screw. The block or head 1 is provided at the top with an intermediate slot or opening 28, through which the screw 24 and the jam nut extends, and with side slots 29 in which adjusting screws 30 operate. The screws 30 are mounted in threaded openings or sockets 31 of the anvil support 20, and their heads engage the block or head 1 at opposite sides of the slots 29, whereby the anvil support is securely locked in its rotary adjustment.

The die bar 18 is elliptical in cross section, and it is adjustably mounted in a cylindrical die holder 32, arranged in a circular bearing opening 33 of the block or head 1, and capable of rotary movement to carry the die bar into and out of engagement with the tooth to be swaged. The bearing opening 33, which is located below the bearing opening 21, extends horizontally through the block or head and intersects the slot. The die holder 32, which is arranged horizontally, is provided with an elliptical bore or opening 34 for the reception of a die bar, and it is recessed or cut away at a point intermediate of its ends to provide an arcuate slot or opening 35 for exposing a portion of the die bar. The slot or opening 35 also receives the lower portion of the anvil, as clearly shown in Fig. 2 of the drawings, and the saw tooth to be swaged extends into the opening 35 of the holder 32. The rear portion of the upper face of the die bar 18 is eccentrically arranged and occupies a position below the anvil, and is adapted to coöperate with the same to swage the saw tooth. The said die bar 18 is adjustable longitudinally to present various portions of its surface for engaging the teeth, and it is adapted to be removed and turned end for end to arrange the other portion of its upper face in position for engaging the saw tooth. Also it is adapted to be reversed to bring its lower face uppermost. By this adjusting and reversing of the die bar, it will be apparent that four distinct swaging surfaces are provided, and that a relatively large amount of such surfaces is afforded for engaging the saw teeth. The die holder is provided at a point between the opening 35 and its front end with an annular groove 36, located at the front face of the head or block 1 and receiving the inner end of the locking plate 37, secured to the block or head by a screw 38 and provided at its inner end with a concavely curved edge 39 to fit the groove of the die holder. The outer portion 40 of the die holder is polygonal and is split longitudinally at diametrically opposite points, as shown at 41 to form compressible clamping sides, which, when pressure is applied to the sides or jaws 42 of an operating lever 43 will clamp and securely hold the die bar. The operating lever 43 is constructed similar to the operating arm or lever 14 of the rear screw 7, and is provided at its lower end with an opening to fit the polygonal portion 40 of the die carrier, and it is equipped with an adjusting screw 44, adapted to draw the sides or jaws of the lever 43 into engagement with the said polygonal portion 40.

The operating arm or lever 43 of the die carrier extends upwardly therefrom, and in order to prevent the anvil from being subjected to excessive pressure, the saw swage is equipped with a gage consisting of a curved supporting bar 45 and adjustable stops 46. The gage bar 45, which has its body portion located above the block or head, is curved longitudinally, and its terminal portions are bent downwardly and inwardly and are secured by screws 47, or other suitable fastening devices to the front face of the block or head 1. The gage bar, which is of uniform size throughout its length, forms a substantially elliptical support, and the stops 46, which consist of horizontal pins or studs, are provided with clamps 48 for engaging the top portion of the gage bar. The clamps 48, which are substantially rectangular, are split at the top at 49, the side portions being connected by an adjusting screw 50, which causes the sides of the clamp to engage the gage bar. The front and rear stops 46 are adapted to be arranged to limit the movement of the operating handle and prevent the die bar or member from coming in actual contact with and exerting excessive pressure on the anvil and thereby injuring the same. In setting the stops, the gage member may be rotated until it strikes the anvil. The front stop can then be adjusted inwardly a short distance to limit such movement of the die member and prevent actual contact between the same and the anvil. The rear stop 46 is set to prevent the edge of the die holder from striking the anvil when the operating lever or arm 43 is swung backward.

The block or body is supported on the saw blade 4 by front and rear guides 51 and 52, which give the swage a well balanced easy gliding movement over the saw blade. The front guide, which extends horizontally from the front portion of the block or head 1, has depending sides or wings 53, which are spaced apart to receive the saw blade and also to receive an adjustable spring 54, extending longitudinally of the guide beneath the body portion thereof, and having its front portion 55 curved upwardly and rearwardly and secured by a screw 56, or other suitable fastening device in a recess of the upper face of the body portion of the front guide 51 at the front end thereof. The body portion of the guide is pierced by a vertical adjusting screw 57, provided at its upper end with a suitable head, and extending below the body portion of the guide and bearing against the upper face of the spring 54. By adjusting the screw 57, the front portion of the device may be raised or lowered to position the die member and the anvil properly with relation to the teeth of the saw blade. The front guide 51 is provided with a curved foot or plate 58, having curved slots 59 and adjustably secured to the front portion of the periphery of the head or block by screws 60 or other suitable fastening devices. The rear guide 52, which has a horizontal body portion, is provided at its inner end with a curved foot or plate 61, secured at a fixed point to the rear portion of the periphery of the block or head by screws 62. The rear guide is equipped with an adjustable guide member 63, secured in a rear vertical opening 64 of the body portion of the guide 52 and having depending sides or wings 65, which are spaced apart to receive the saw blade 4. The rear end of the body portion of the guide 52 is split longitudinally at 66 to form two clamping sides, which are connected by a transverse adjusting screw 67, adapted to cause the sides or clamping portions of the rear guide to engage and release the vertically adjustable guide member 63 to position the same with relation to the saw blade. By this construction the rear portion of the saw swage may be raised or lowered. The guide member 63 also carries a horizontal plate or spring 68, secured at an intermediate point by a screw 69, or other suitable fastening device to the adjustable member 63 between the sides or wings 65. The plate or spring 68 rests upon and yieldably supports the swage upon the saw blade, and each spring 54 and 68 uniformly bears on two of the teeth of the saw.

In Figs. 8 and 9 of the drawings is illustrated a saw gage, arranged for swaging the teeth of a circular saw. The rear guide is not employed, and a front guide or support 70 is substituted for the front guide 51. The front guide or support 70 consists of an inclined bar, provided at its upper end with a curved plate 71, which is rigidly secured by screws 72 to the front portion of the periphery of the block or head. The inclined bar or body portion of the front guide or support 70 is also provided at its front or lower end with a curved head 73, having a curved adjusting slot 74, receiving a fixed pivot 75. The pivot 75 is fixed to a suitable attaching plate 76, which is secured to the upper face of a bench 77. The pivot extends through the curved slot 75 and is threaded for the reception of a clamping nut 78, having a suitable handle 79 to enable it to be readily rotated with sufficient force to secure the support 70 in its adjustment. In order to increase the leverage for operating the die member and to enable sufficient pressure to be applied to the tooth of the circular saw 5 to easily swage the same, a sector-shaped gear member 80 is mounted on the die holder, and a lever 81 having a partial gear 82 is also employed. The lower end of the lever 81 is sector-shaped and provided at the periphery with teeth to form the partial gear 82, which meshes with the gear member 80. When the lever 81 is oscillated, the gear element formed by its toothed portion meshes with the gear member 80 and the die holder is partially rotated, the movement of the lever being limited by the front and rear stops heretofore described.

Having thus fully described my invention, what I claim as new and desire to secure by Letters Patent, is:—

1. A saw swage including a head, a rotary anvil support mounted in the head, an anvil depending from the support and carried by the same in the rotary movement thereof, and a screw mounted on the support and forming an adjustable abutment for the anvil, and a die member coöperating with the anvil.

2. A saw swage including a head, a rotary anvil support mounted in the head, an anvil carried by the support, the latter being provided with means for holding the anvil against rotary movement, an adjusting screw mounted on the support and forming an adjustable abutment for the anvil, and a die member coöperating with the anvil.

3. A saw swage including a head, a transversely arranged rotary anvil support mounted in the head and provided at the bottom with a groove, a reversible anvil depending from the support and consisting of a round shank and a block fitted in the groove and held against rotary movement by the walls thereof, a screw mounted on the anvil support and engaging the stem of the anvil for adjusting the latter, and a die member coöperating with the anvil.

4. A saw swage including a head, a transverse anvil support mounted in the head for rotary movement, an anvil depending from the support and carried by the same in the rotary movement thereof, a screw mounted on the support and forming an adjustable abutment for the anvil, and an adjusting screw also mounted on the support and engaging the head for securing the said support in its adjustment.

5. A saw swage including a head provided with a transverse bearing and having intermediate and side slots communicating with the said opening, a cylindrical anvil support journaled in the bearing opening, an anvil carried by the support in the rotary movement thereof, an adjusting screw mounted on the support and operating in the intermediate slot of the head and forming an adjustable abutment for the anvil, side screws also mounted on the support and operating in the side slots for securing the support in its adjustment, and a die member coöperating with the anvil.

6. A saw swage including a head having a transverse bearing opening, a cylindrical anvil support mounted for rotary movement in the said opening and provided at the bottom with a groove and having an opening extending upward from the groove, an anvil fitted in the groove of the support and having a stem extending into the opening of the same, said anvil being provided with a straight lower edge and beveled or cut away at the corners, a screw operating in the said opening for engaging the stem of the anvil, a lock nut mounted on the screw and engaging the anvil support, and a die member mounted in the head and coöperating with the anvil.

7. A saw swage including a head, an anvil mounted within the head, a hollow rotary die holder journaled in the head and split to form opposite exterior clamping portions terminating short of the head, a die member adjustably fitted in and supported by the hollow carrier and exposed within the said head and at a point beyond the split clamping portions of the holder, and an operating device mounted on the split portions of the carrier and engaging the same to clamp and adjustably hold the die member.

8. A saw swage including a head, an anvil mounted within the head, a cylindrical die carrier journaled in the head and having a longitudinal bore and provided at an intermediate point with an opening, said carrier being split beyond the opening to provide opposite clamping portions, a die member adjustable in the bore of the die carrier and exposed at the said opening, and an operating handle having clamping means embracing the split portion of the die carrier and causing the same to clamp the die member.

9. A saw swage including a head, an anvil located within the head, a die member coöperating with the anvil, a handle connected with the die member for oscillating the same, and a gage composed of a longitudinal gage bar of uniform size throughout its length and having its terminals extended downwardly and inwardly and secured to the front face of the head, clamps having openings to receive the gage bar and split at one end of the openings to form clamping sides or jaws, adjusting screws connecting the split portions of the sides or jaws beyond the opening for holding the said sides or jaws in engagement with the gage bar, and horizontally projecting studs forming stops and carried by the said clamps and arranged to limit the movement of the handle.

10. A saw swage including a head, anvil and die members located within the head, and a guide composed of a body portion provided at the inner end with a foot secured to the side face of the head and having depending sides or wings, and a bowed spring extending around the outer end of the body portion of the guide, said spring being secured at its upper side to the upper face of the said body portion and having a straight lower portion extending between the sides or wings, the rear end of the spring being free and spaced from the guide, and adjusting means mounted on the guide and engaging the spring.

11. A saw swage including a head, anvil and die members located within the head, and a guide composed of a horizontally projecting body portion having an attaching foot at its inner end and provided at the outer portion with an opening and split at the outer end of the same to form clamping jaws, a vertically adjustable guide member slidable through the opening of the said body portion and clamped by the jaws thereof and provided with depending wings, and a straight horizontal spring secured at an intermediate point to the guide member between the wings thereof and extending in advance and in rear of the same.

12. A saw swage including a head, anvil and die members located within the head, an operating handle connected with the die member, a longitudinal gage bar located above the head and having terminal portions extended downwardly and inwardly, and secured to the front face of the head, adjustable stops mounted on the gage bar and limiting the movement of the handle, and guides extending in opposite directions from the head and each having an attaching foot at its inner end secured to the periphery of the head adjacent to the terminals of the gage.

13. A saw swage including a head, a transversely arranged horizontally disposed anvil support journaled for rotary movement in the head and provided at the bottom with a groove, an anvil fitted in the groove and depending from and adjustable independently of the support, and a die member coöperating with the anvil.

In testimony, that I claim the foregoing as my own, I have hereto affixed my signature in the presence of two witnesses.

THOMAS F. CARROLL.

Witnesses:
DAVID P. BARNES,
N. MALLARD.